US006808731B1

(12) United States Patent
Gutwein et al.

(10) Patent No.: US 6,808,731 B1
(45) Date of Patent: Oct. 26, 2004

(54) COFFEE EXTRACT AND PROCESS FOR PROVIDING CUSTOMIZED VARIETIES AND STRENGTHS OF FRESH-BREWED COFFEE ON DEMAND

(75) Inventors: Roger William Gutwein, Cincinnati, OH (US); Christopher Wade Connor, Cincinnati, OH (US)

(73) Assignee: The Procter & Gamble Co., Cincinnati, OH (US)

( * ) Notice: Subject to any disclaimer, the term of this patent is extended or adjusted under 35 U.S.C. 154(b) by 0 days.

(21) Appl. No.: 09/638,654

(22) Filed: Aug. 14, 2000

Related U.S. Application Data

(60) Provisional application No. 60/148,965, filed on Aug. 14, 1999.

(51) Int. Cl.$^7$ ................................................. A23F 5/00
(52) U.S. Cl. ........................................ 426/433; 426/594
(58) Field of Search ................................. 426/433, 594

(56) References Cited

U.S. PATENT DOCUMENTS

| | | |
|---|---|---|
| 2,890,648 A | 6/1959 | King |
| 3,385,201 A | 5/1968 | Martin |
| 3,532,505 A | 10/1970 | Cornelius |
| 3,582,351 A | 6/1971 | Austin et al. |
| 3,607,280 A | 9/1971 | Durchholz |
| 3,619,205 A | 11/1971 | LeVan et al. |
| 3,634,107 A | 1/1972 | Cornelius |
| 3,641,918 A | 2/1972 | Schellgell et al. |
| 3,655,398 A | 4/1972 | Pitchon et al. |
| 3,854,389 A | 12/1974 | Hillemann |
| 3,944,677 A | 3/1976 | Katz |
| 3,987,211 A | 10/1976 | Dunn et al. |
| 4,039,693 A | 8/1977 | Adams et al. |
| 4,064,795 A | 12/1977 | Ackerman |
| 4,088,794 A | 5/1978 | Katz et al. |
| 4,108,053 A | 8/1978 | Vink |
| 4,143,590 A | 3/1979 | Kasakoff |
| 4,147,097 A | 4/1979 | Gregg |
| 4,189,067 A | 2/1980 | Nottke et al. |
| 4,194,650 A | 3/1980 | Nottke et al. |
| 4,275,085 A | 6/1981 | Gregg |
| 4,277,509 A | 7/1981 | Wouda |
| 4,309,939 A | 1/1982 | Stover |
| 4,309,940 A | 1/1982 | Lowerre, Jr. |
| 4,316,916 A | 2/1982 | Adamer |
| 4,328,740 A | 5/1982 | McDonough et al. |
| 4,334,640 A | 6/1982 | van Overbruggen et al. |
| 4,366,262 A | 12/1982 | Covitch |
| 4,448,113 A | 5/1984 | Brabon |
| 4,470,999 A | 9/1984 | Carpiac |
| 4,493,249 A | 1/1985 | Stover |
| 4,532,142 A | 7/1985 | Dean |
| 4,550,651 A | 11/1985 | Haynes |
| 4,579,048 A | 4/1986 | Stover |
| 4,618,500 A | 10/1986 | Forquer |
| 4,621,571 A | 11/1986 | Roberts |
| 4,624,395 A | 11/1986 | Baron et al. |
| 4,649,809 A | 3/1987 | Kanezashi |
| 4,697,502 A | 10/1987 | English et al. |
| 4,701,333 A | 10/1987 | Margolis et al. |
| 4,708,263 A | 11/1987 | le Granse |
| 4,717,047 A | 1/1988 | van Overbruggen et al. |
| 4,757,752 A | 7/1988 | Robins et al. |
| 4,790,239 A | 12/1988 | Hewitt |
| 4,791,860 A | 12/1988 | Verheijen |
| 4,797,293 A | 1/1989 | Evans et al. |
| 4,798,732 A | 1/1989 | Osawa |
| 4,809,594 A | 3/1989 | Vitous |
| 4,815,633 A | 3/1989 | Kondo et al. |
| 4,830,869 A | 5/1989 | Wimmers et al. |
| 4,903,585 A | 2/1990 | Wimmers et al. |
| 4,911,067 A | 3/1990 | Oppermann |
| 4,919,041 A | 4/1990 | Miller |
| 4,920,871 A | 5/1990 | Anson et al. |
| 4,983,408 A | 1/1991 | Colton |
| 4,983,412 A | 1/1991 | Hauslein |
| 5,000,082 A | 3/1991 | Lassota |
| 5,025,714 A | 6/1991 | Brewer |
| 5,113,752 A | 5/1992 | Brewer |
| 5,114,047 A | 5/1992 | Baron et al. |
| 5,132,135 A | 7/1992 | Schweinfurth |
| 5,204,139 A | 4/1993 | Choi |
| 5,207,148 A | 5/1993 | Anderson et al. |

(List continued on next page.)

FOREIGN PATENT DOCUMENTS

| | | |
|---|---|---|
| CH | 650 140 A5 | 7/1982 |
| EP | 0 079 235 | 11/1982 |
| EP | 0 886 249 A1 | 10/1997 |
| EP | 0 893 065 A2 | 6/1998 |
| FR | 2 758 962 | 1/1997 |
| GB | 2 063 515 A | 10/1979 |
| JP | 09-147227 | 6/1997 |
| JP | 09-198570 | 7/1997 |
| JP | 09-218980 | 8/1997 |

*Primary Examiner*—Anthony Weier
(74) *Attorney, Agent, or Firm*—Theodore P. Cummings; Erich D. Hemm

(57) ABSTRACT

An improved process for providing an individually customized fresh brewed coffee beverage on demand by a consumer, in a wide range of variety and strength. Said brewing process is useful for making relatively large quantities of fresh brewed coffee beverages (in particular customized as to desired variety, body, character and/or strengths) as chosen by multiple individual consumers just prior to their consumption. Said process is easy to use by the consumer or other individual (i.e.,restaurant wait staff) obtaining the customized beverage. Further, maintenance of the equipment requires only a small amount of personal attention by the owner/operator of the equipment. "Delayed dilution" of a concentrated extract is utilized to provide a beverage brewing system which immediately (upon customer selection) provides selective dilution (based on individual consumer's selections) of a fresh brewed coffee extract after the extract has been allowed to brew and held as an extract before dilution.

26 Claims, No Drawings

U.S. PATENT DOCUMENTS

| | | |
|---|---|---|
| 5,245,914 A | 9/1993 | Vitous |
| 5,249,509 A | 10/1993 | English |
| 5,323,691 A | 6/1994 | Reese et al. |
| 5,325,765 A | 7/1994 | Sylvan et al. |
| 5,353,692 A | 10/1994 | Reese et al. |
| 5,358,725 A | 10/1994 | Izumitani et al. |
| 5,384,143 A | 1/1995 | Koyama et al. |
| 5,427,806 A | 6/1995 | Ekanayake et al. |
| 5,431,940 A | 7/1995 | Calderas et al. |
| 5,476,033 A | 12/1995 | Locati |
| 5,579,678 A | 12/1996 | Goerndt |
| 5,584,229 A | 12/1996 | Anson |
| 5,619,901 A | 4/1997 | Reese et al. |
| 5,637,343 A | 6/1997 | Ryan, Jr. |
| 5,650,186 A | 7/1997 | Annoni et al. |
| 5,664,480 A | 9/1997 | DiFilippo |
| 5,665,415 A | 9/1997 | Kligerman et al. |
| 5,680,108 A | 10/1997 | Daniell et al. |
| 5,721,005 A | 2/1998 | Gutwein et al. |
| 5,724,882 A | 3/1998 | Gallas et al. |
| 5,724,883 A | 3/1998 | Usherovich |
| 5,733,591 A | 3/1998 | Goerndt |
| 5,740,719 A | 4/1998 | Triola et al. |
| 5,773,067 A | 6/1998 | Freychet et al. |
| 5,775,204 A | 7/1998 | Link et al. |
| 5,778,761 A | 7/1998 | Miller |
| 5,803,320 A | 9/1998 | Cutting et al. |
| 5,840,189 A | 11/1998 | Sylvan et al. |
| 6,203,837 B1 * | 3/2001 | Kalenian |

* cited by examiner

COFFEE EXTRACT AND PROCESS FOR PROVIDING CUSTOMIZED VARIETIES AND STRENGTHS OF FRESH-BREWED COFFEE ON DEMAND

CROSS REFERENCE TO RELATED APPLICATION

This application claims the benefit of priority to U.S. Provisional Application Ser. No. 60/148,965, filed Aug. 14, 1999, which is herein incorporated by reference.

FIELD OF THE INVENTION

The present invention is directed to a process for providing to a consumer (at home or away from home) quantifies of ready-to-drink fresh brewed coffee. The consumer may customize a selection of coffee based upon his/her taste preferences and the serving of fresh-brewed coffee will be provided almost Immediately to the consumer.

More particularly, the present invention is directed to a method in which information is collected from a consumer regarding certain quantity, taste and strength preferences of the consumer. The information collected will be used to customize a suitable coffee beverage for the individual consumer. The means for dilution of the coffee extract is linked to the information system so that a coffee extract which has been recently (in the past several minutes and no more than 48 hours) brewed is diluted according to the individual consumer's strength preferences. The "delayed dilution" aspects of the present invention are used to accommodate the individual consumer's taste preferences by utilizing multiple varieties of roast and ground coffee types in the system, and by using the undiluted extract to mix/dissolve other beverage compounds or flavors to make cappuccinos, lattees, etc., with minimal dilution to the final beverage.

By providing a high volume, fresh-brewed coffee making apparatus and dispensing successive servings of coffee, the invention is particularly desirable in the restaurant, (especially fast food) environment, as well as commercial and industrial settings (office buildings, workplaces, hospitals, and the like, with large waiting areas). The Intent Is to brew and hold the fresh brewed coffee extracts in quantities sufficient to satisfy demand, without the necessity of making large quantities of coffee extracts and then storing them in several containers and eventually discarding the deteriorated old brew.

This invention may also be used in household environments where it may be desirable to make several different types of finished coffee products tailored to the taste preferences of several household members. Because these many variations may be made from earlier, initial brews, the variations can be provided immediately upon the selection of each individual's customized product.

BACKGROUND OF THE INVENTION

Much study has been given to the most satisfactory way to brew roast and ground coffee and it is a fact that an excellent grade of coffee (property grown and optimally roasted) can be effectively ruined for consumption by improper methods of preparation. In general, a high quality and most satisfying coffee drink is obtained only when it possesses fine aroma, delicacy of flavor, and fullness of body, as well as warmth and stimulating character.

Also importantly, many consumers have come to appreciate the many various options available with respect to coffee products (e.g., variations in strength, variety type, creaminess, flavors) and there are a wide variety of coffee options. However, especially in a commercial/industrial setting (restaurant, fast/food industry, workplace, hospitals), there are many hurdles (space, difficulty, time, inconvenience) to be overcome in delivering, especially on demand, the preferred choice of coffee to a wide range of consumers. Additionally, most individual households comprise family members with various taste preferences; heretofore, it has been, at best, cumbersome and bothersome to address individual preferences, and would generally require many different brewing cycles and many different receptacles to accommodate mixing. It would be desirable to employ one (or at least a minimal number on brewing process in a single countertop station to efficiently accommodate various taste preferences in a household environment. Coffee beverages comprise an aqueous solution of the water-soluble (and sometimes insoluble) constituents of the roasted and ground beans of the tree of the family Rubiaciae. There are many varieties of this plant, but the two having the most significance commercially is *Caffee arabica* and *Caffea canephora* (robusta).

Almost universally, the extract is brewed by contacting the roasted and ground coffee with hot water at a temperature from moderately-below boiling to moderately-above boiling, for a predetermined brewing time, separating the extract (including the solutes) from the insolubles, and consuming the resulting beverage.

Brewing methods can generally be categorized in three broad groups: (1) single-pass infusions in which the water is percolated or pumped through the roasted and ground coffee (which may partially serve as its own filter) then filtered through a metal, paper, or cloth sieve; (2) percolation methods which recycle the extract through one or more volumes of grind consecutively, in either a co-current or countercurrent flow, before the extract is siphoned off at the requisite strength; and (3) batch-slurry methods in which a fixed volume of coffee is mixed with a fixed volume of water in a brewing vessel, permitted to steep with or without agitation, then filtered or mechanically separated to produce the extract Some currently available beverage brewing devices provide essentially instantaneous hot water to brew beverages in a short amount of time. These devices typically have a hot water reservoir which maintains a volume of water at a predetermined temperature. A cold water fill tube is attached inside the reservoir, one end close to, but not abutting, the bottom of the hot water reservoir, of a separate cold water reservoir or basin positioned above the heated reservoir. A hot water discharge tube has one end positioned in the hot water reservoir near an outlet zone generally at the top of the hot water reservoir. Another end of the discharge tube delivers hot water transported through the tube to a beverage brewing substance in order to produce a brewed beverage concentrate.

In order to brew a beverage in a beverage brewing device as described above, cold water is poured into the basin. The cold water flows through the cold water fill tube and accumulates at the bottom of the hot water reservoir due to temperature variations between the cold and hot water. The hot water is displaced by the cold water and moves upwardly towards the top of the hot water reservoir, which is sealed by a cover, and through the hot water discharge tube. Upon being dispensed into a beverage brewing substance, the hot water and beverage brewing substance create a brewed beverage concentrate. (For examples of representative instantaneous hot water beverage brewing apparati, see U.S.

Pat. No. 3,385,201 to Martin, U.S. Pat. No. 4,920,871 to Anson, and U.S. Pat. No. 5,025,714 and U.S. Pat. No. 5,113,752, both to Brewer.)

Dilution of the brewed concentrate is necessary in order to prevent the brewed concentrate from being too strong as well as preventing an additional manual step of diluting the concentrate after it has been brewed. Dilution of the brewed concentrate is achieved by feeding additional water from the basin to either the brewing funnel and allowing it to pass through the coffee grounds or the area between the inner brewing funnel and the outer brewing funnel.

Equipment for brewing beverages such as coffee and the like have typically been of the "single station" type, in which an empty carafe or pot is positioned on a heating element below a receptacle or brewing funnel which contains a measured quantity of dry beverage-making material, e.g. roast and ground coffee. Hot water is then passed through the material to extract the essential oils, flavor and body that make up the beverage, and then drains downwardly through an opening in the funnel into the pot or carafe. If and when a second pot or carafe of beverage is needed, the first must be moved to a separate heating element or plate.

Although such prior beverage brewers work satisfactorily for making relatively small quantities of beverage, in restaurants and other commercial and institutional establishments, there is a continuing need for equipment to make large quantities of coffee, but be able to instantaneously accommodate the taste preferences of a wide variety of consumers; furthermore, this equipment must be easy to use and relatively automatic so as not to require an unreasonable amount of personal attention during the brewing cycle. The needs of restaurants, institutions and other commercial establishments are of particular concern in regard to equipment for brewing and making an acceptable cup of coffee to an individual consumer, given the limitations of space, labor, and time.

It is necessary to provide equipment which requires minimum maintenance by the employees. It is imperative to provide equipment which will make a sufficient volume of brew to meet the customer demands without overproducing, but in adequate quantities which can be replenished within a reasonable time with minimum attention by the employees. Additionally, and preferably, the equipment should be compact It is, therefore, desirable to provide a coffee-brewing process which will allow a consumer to customize their preferred variety of coffee from a virtually endless selection of possibilities; the process of the present invention will provide an individually customized serving of coffee beverage delivered hot and ready to drink on demand by the consumer.

SUMMARY OF THE INVENTION

Accordingly, it is a general object of the present invention to provide an improved process for providing an individually customized fresh brewed coffee beverage on demand by a consumer, in a wide range of variety and strength.

It is a further object of the present Invention to provide a brewing process for making relatively large quantities of fresh brewed coffee beverages (in particular customized as to desired variety, body, character and/or strengths) as chosen by multiple individual consumers just prior to their consumption. Said process is easy to use by the consumer or other individual (i.e., restaurant wait staff) obtaining the customized beverage. Further, maintenance of the equipment requires only a small amount of personal attention by the owner/operator of the equipment It is another object of the present invention to provide such brewing apparatus which is particularly useful for providing coffee according to individual consumer selection, but in large, commercial or institutional quantities.

A general object of the present invention is to utilize "delayed dilution" of a concentrated extract to provide a beverage brewing system which immediately (upon customer selection) provides selective dilution (based on individual consumer's selections) of a fresh brewed coffee extract after the extract has been allowed to brew and held as an extract before dilution.

These and other objects of the present invention are set forth more clearly and fully in the following detailed description of the invention described herein.

DETAILED DESCRIPTION OF THE INVENTION

The present invention relates to a coffee extract product which provides slower degradation rates during hold time while maintaining fully-extracted flavor. The coffee extract of the present invention has.

(1) a brew solids level of from greater than about 1.2%, preferably greater than about 1.5 %, and more preferably greater than about 2.0%; and (2) a Delta Standard Yield of at less than about 8 %, preferably less than about 5%, and most preferably less than about 3%.

A common problem associated with preparing ready to drink coffee beverages from coffee extracts is that the diluted coffee extracts generally age upon hold and exhibit undesirable flavor. High concentrated (generally above 30% brew solids) have an undesired "extract" note and/or an "under-extracted" flavor, (i.e. lack the characteristic flavor associated with fresh brewed coffee.

The present invention is also directed to a process for the selection of one or more varieties of ready to drink coffee products from a plurality of options, as well as the provision of "fresh-brewed" ready to drink coffee on demand. The method of the present invention comprises three basic steps: collecting information from a consumer regarding the consumer's desires as to the variety of coffee he'she desires at that point in consumption; a process linking the consumer's choice of coffee product to a holding area which contains an amount of fresh-brewed extract; and an area where the dilution of the coffee occurs at a ratio of water to fresh-brewed coffee extract that is consistent with the consumer's choice as to brew strength and variety.

A. Definitions

As used herein the term "fresh-brewed coffee beverages" refers to those beverages which are made from fresh-brewed coffee extract and coffees and other coffee-based beverages, and coffee beverage products which are derivatives and/or variants of the above.

As used herein, "coffee beverages include cappuccinos, espressos, lattes, flavored and/or creamy coffee beverages, and other coffee-based beverages which are derivatives and/or variants of the above.

As used herein the terms "ready-to-serve beverage" and "ready-to-drink beverage" are used interchangeably to refer to beverage products that are in a ready4use, consumable form. They are made from fresh brewed coffee extracts and can also include dry mixes, powders, liquid, extracts, concentrates, and emulsions, in a wide variety of formulations.

The term "fresh-brewed" as used herein refers to beverage extracts which have been extracted and held for a "hold-time" for at least about 5 minutes, preferably at least about 15 minutes and most preferably at least about 30 minutes and no more than about 48 hours, preferably no more than about 24 hours, more preferably no more than about 12 hours, most preferably no more than about 6 hours.

The term "hold time" means that period of time beginning with the onset of brewing of the extract and ending when dilution begins. For multiple brews into one holding tank, the "o-time" would be the weighted average of the extracts still in the tank The temperature of the brew as it leaves the extractor is greater than 100° F., preferably greater than 120° F., more preferably greater than 150° F., and most preferably greater than about 170° F., and the brew solids is less than about 10%, preferably less than about 5%, more preferably less than about 4%, most preferably less than about 3.5%.

The term "classifications" as used herein means characteristics or attributes of certain types of coffee beverage and include temperature, strength, body (full or light), roast (color or degree), acidity, sweetness, bitterness, and/or mouthfeel.

The term "variety" means country of origin (grown) and/or specific growing region (e.g., variety), including harvesting and post-harvesting techniques, within a given species or a specifies within a genus. Coffee beans useful in the present invention can be either of a single type or grade of bean or can be formed from blends of various bean types or grades, and can be undecaffeinated or decaffeinated. These high-grown-type beans are typically referred to as high grade coffees. Suitable high grade coffee having high acidity include Arabicas and Colombians characterized as having "excellent body," "add," fragrant," "aromatic" and occasionally "chocolatey." Examples of typical high quality coffees are "Milds" often referred to as high grade Arabicas, and Include among others Colombians, Mexicans, and other washed Milds such as strictly hard bean Costa Rica, Kenyas A and B, and strictly hard bean Guatemalans.

As used herein, the term "comprising" means that the various coffees, other ingredients, or steps, can be conjointly employed in practicing the present invention. Accordingly, the term "comprising" encompasses the more restrictive terms "consisting essentially of" and "consisting of."

All ratios and percentages herein are based on weight unless otherwise specified.

B. The Coffee Beverage Extract

The present invention relates to a coffee extract product which provides slower degradation rates during hold time while maintaining fully-extracted flavor. The coffee extract of the present invention has:

(1) a brew solids level of from greater than about 1.2%, preferably greater than about 1.5%, and more preferably greater than about 2.0%; and (2) a Delta Standard Yield of at less than about 8%, preferably less than about 5%, and most preferably less than about 3%.

Another important characteristic of coffee beverages prepared from roast and ground or flaked coffee products according to the present invention is the level of brew solids. Brew solids are simply the solids remaining after oven drying the brewed coffee. Brew solids is an indication of the mass transfer that has occurred from the solid grounds to the water phase during brewing.

Analytical Methods

1. Brew Solids

The brewed coffee is placed in a 12 ml sealed vial and allowed to cool. The sample is then analyzed for solids content by index of refraction using a Bellingham & Stanley RFM 81, where the sample temperature during the measurement is maintained at 29° C. The readings are correlated with readings of reference solutions of known brew solids content based on oven drying techniques using a correlation of Refractive Index=0.001785×(% brew solids)+1.331995

2. Extraction Yield

This measurement is the brew solids yield of the coffee extract and is the weight of the filtered extract multiplied by the fraction of brew solids in the extract, divided by the initial weight of dry roast and ground or flaked coffee before brewing begins.

3. Standard Brewing Method

Coffee is brewed on a Bunn OL-35 automated drip brewer. Coffee fitters are 12 cup oxygen processed Bunn Coffee filters (Reg. 6001). A weight of one ounce of coffee is added to the filter in the basket. The brewer is supplied with distilled water and feeds 1860 ml at 195OF (90° C.) in 148 seconds to the brew basket. Brewed coffee is collected in a carafe and then mixed. Samples for brew solids are then collected.

4. Delta Standard Yield

This Delta Standard Yield is the resulting yield of the comparison extract (e.g., coffee extract of the present invention) subtracted from the Extraction Yield and the Extraction Yield of the Standard Brewing Method.

C. Delayed Dilution

The process of the present invention offers customization of fresh brewed coffee based upon consumer preferences by utilization of delayed dilution of the fresh brewed coffee extract.

As used herein, the term "delayed dilution" refers to the aspect of holding the fresh brewed coffee extract for a minimum period of about 5 minutes, preferably of about 15 minutes, more preferably of about 30 minutes; "delayed dilution" also refers to the aspect of holding the extract for a maximum period of time of about 48 hours, preferably of about 24 hours, more preferably of about 12 hours, most preferably of about 6 hours.

The fresh-brewed extract prepared according to the process of the present invention has a brew solids of less than about 10%, preferably less than about 5%, more preferably less than about 4%, most preferably less than about 3.5%. In a particularly preferred aspect of the present invention, the minimum brew solids is greater than about 1.2%, preferably greater than about 1.5%, and most preferably greater than about 2.0%.

It is important to recognize that this aspect of the present invention allows the individual's preferred coffee to be customized just prior to dispensing; there is no pre-determination of character or strength as is seen with many automated systems. The "delayed dilution" aspect allows multiple servings of individually tailored coffee to be prepared from a minimum number of, preferably one, brew cycles. Additionally, these individually tailored servings are dispensed on demand.

Said dilution ratios will be from about zero (no dilution) to about 1:15 coffee/water, and can be easily varied, utilizing currently available methods, upon receiving the consumer's selection input regarding strength. Also, the temperature of the dilution water may be varied to accommodate individual consumer preferences around consumption temperature; there are several ways that this could readily be accomplished, but one preferred way would be to have two dilution lines; one for hot (170–190° F.) and one for cold (40–80° F.) water and coordinate their rate and flow to deliver the coffee to each individual consumer at their preferred temperature.

In the practice of the present invention, the weight ratio of the extraction portion of water to dry, roast and ground coffee is from about 5:1 to about 24:1; preferably from about 8:1 to about 13:1. When this amount of water is used for (drip) extraction, a relatively strong (meaning concentrated but not bitter) filtered coffee extract is issued. Normally, this extract will have a soluble solids content by weight of greater than about 1.2%, preferably 1.5%. The relatively strong filtered coffee extract is then diluted with a sufficient amount of dilution water to a preferred beverage concentration.

The term "variety creating systems/devices" as used herein refers to devices and processes that can transform one or more input materials into multiple varieties of beverages. Such systems and devices including delayed dilution means/systems; delayed filtering means/systems, and/or delayed filtration means/systems.

Clearly, this aspect of the system of the present Invention imparts many benefits to the fresh-brewed extract that result in a better final coffee beverage for the consumer. For instance, delaying dilution of the extracted coffee removes the need to hold the coffee in a "consumption-ready," i.e., "ready-to-drink", state (e.g., diluted and at a desired temperature). In the undiluted state, the coffee has less water and degrades at a slower rate. Additionally, the need to heat or cool during holding is minimized.

Further, the undiluted extract takes up less space and can be more easily surged in a given physical geometry. An additional benefit of the smaller space is that the equipment (station) can be more economically sealed against oxygen contact. Because of the concentration of the extract the extract will also have less dissolved oxygen per dissolved coffee solids which will slow down the oxidation reactions (less volume of aqueous solution per coffee solids).

Employing the "delayed dilution" aspect of this present invention results in many benefits to the finished cup of coffee; this ultimately results in less "too old" or "stale" coffee being served. The reaction rates that occur during holding are minimized by delayed dilution. In a particularly preferred embodiment of the present invention, the brewed extract may be cooled or refrigerated, to less than 170° F., preferably to less than 160° F., more preferably to less than 140° F., and most preferably between 35° F. and 50° F. to further reduce the changes occurring during holding the extract much less energy and space will be required to run this system, as it is easier to heat and keep hot water than to keep brewed hot coffee ready to dispense. It will be recognized by those skilled in the art that cooling or refrigerating the extract will further increase maximum hold times that can still maintain desirable flavor attributes.

EXAMPLES

While particular embodiments of the present invention have been illustrated and described, it would be obvious to those skilled in the art that various other changes and modifications can be made without departing from the spirit and scope of the invention.

Example 1

A.) An extract Is prepared by placing 410 grams of all arabica roast and ground coffee (which has a Standard Brewing Method Extraction Yield of 31%) in a standard brew basket/funnel of a 1% gallon satellite brewer. 4500 milliliters of water is delivered to the brew basket at atmospheric pressure. Water is delivered at 200° F. and 10 nilliliters per second. The brew is filtered with standard paper coffee filters the resultant brew is 2.8% brew solids with an extraction yield based on brew solids at 28%. The extract exit temperature was 175° F.

B.) The coffee extract is held for up to 48 hours on a Bunn Softheath™ satellite system at 180° F.

C.) Products are selected based on images and words surrounding the strength characteristics. A push button or spigot delivers coffee of differing characteristics. The consumer samples product variety until they find what Is most appealing to them.

D.) Products are delivered to the consumer via a system that combines the held extract with water at 170° F. for hot beverages. The ratio of water to extract controls the resultant strength of the brew.

Example 2

A.) An extract is prepared by placing 205 grams of roast and ground decaffeinated coffee (having a Standard Brewing Method Extraction Yield of 30%) Into an automatic slurry brewer equipped with a metal mesh filter. While the brew basket exit is closed, an initial 200 ml of 203° F. water is delivered to the closed system and allowed to steep for 200 seconds. The brew basket is allowed to open and the extract is allowed to drain. An additional 900 ml of 203° F. water is then delivered to the coffee at 5 ml/s under constant pressure. The final coffee extract is 7.7% brew solids and 25% brew solids yield.

B.) The coffee extract is held in a dose tank heated to 160° F.

C.) Consumer establishes a personal profile over the Internet or at the system and answers a few simple questions around preference. These questions help deliver the product with the right profile. The profile is maintained in a central database accessed by the system vi wireless, local area network (LAN)or telephone communication devices wherever the consumer is. The consumer is recognized via a personal identification number (PIN) stored in radio frequency Identification tags RFID, matrix cards, or their credit card. Consumer can get their own designed drink or choose from a variety of drinks that are close to their prescribed beverage in personal acceptance.

D.) The extract is diluted with water to produce a variety of strengths from 0.1% brew solids to 7.7% brew solids.

Example 3

A) An extract is prepared by placing 76.5 grams of roast and ground and flaked coffee (having a Standard Brewing Method Extraction Yield of 32.5%) In a standard brew basket of a ½ a gallon bottle brewer. 1860 milliliters of water is delivered to the brew basket at 200° F. and 12 milliliters per second and ambient pressure. The brew is filtered with standard paper coffee filters the resultant brew is 1.4% brew solids with an extraction yield based on brew solids at 31.5%. The extract exit temperature was 172 F.

B.) The coffee extract is held for up to 48 hours at near adiabatic conditions in a sealed glass lined thermos maintained at 160° F.

C.) Consumer is allowed to choose from flavor profile of different attributes in creating their own cup. This is done with slide bars and selectors or a multidimensional space representing the world of beverage taste including strength, sweetness, creaminess, and flavor.

D.) The extract Is diluted with hot water at any proportions from all extract to all water. The extract was diluted to full strength (0:1), half strength (1:1, 0.7% brew solids), third strength (2:1, 0.7% brew solids) and quarter strength (3:1, 0.35% brew solids). The resultant extract was also mixed with 20% cappuccino powder at similar strengths. The resultant products range from very sweet creamy cappuccinos to high coffee flavored cappuccinos. The cappuccinos were then blended with a 50% solution of sized Ice to create slushed cappuccinos.

Example 4

A/B) The extract from Example 1 and the extract from Example 2 were loaded into a system.

C) User selects at various times the character of the coffee they prefer via an consumer interface window.

D) Table of Use History. The coffee extracts were blended together as stated below and

| User | Time (Hour) | Extract 1 | Extract 2 | Water to Extract Ratio |
| --- | --- | --- | --- | --- |
| 1 | 0.75 | 50% | 50% | 3:1 |
| 2 | 1.5 | 40% | 60% | 4:1 |
| 3 | 4 | 100% | 0% | 3:1 |
| 4 | 6 | 25% | 75% | 6:1 |

Example 5

A.) An extract is prepared by placing 205 grams of roast and ground decaffeinated coffee into an automatic slurry brewer equipped with a metal mesh filter. While the brew basket exit is closed, an initial 200 ml of 203° F. water is delivered to the closed system and allowed to steep for 200 seconds. The brew basket is allowed to open and the extract is allowed to drain. An additional 900 ml of 203° F. water is then delivered to the coffee at 5 mVs under constant pressure. The final coffee extract is 7.7% brew solids and 25% brew solids yield.

B.) The coffee extract is held in a closed tank heated to 160° F.

C.) Consumer establishes a personal profile over the Internet or at the system and answers a few simple questions around preference. These questions help deliver the product with the right profile. Consumer can get their own prescribed beverage or choose from a variety of drinks that approximate prescribed beverage in their personal acceptance profile.

D.) The extract is diluted with water to produce a variety of strengths from 0.1% brew solids to 7.7% brew solids. A diluted extract of 2.0% brew solids was whipped in a high shear blender to produce a cream. This blend was then dosed with a 0.05% vanilla flavoring and 5% sugar.

The steps A/D in each the above Examples may be substituted for each other, e.g., A.) in Example 1 for A.) in Example 4.

What is claimed is:

1. A process of forming a customized coffee beverage from a brewer, comprising:
   brewing a coffee extract;
   storing the coffee extract in the brewer for no more than forty-eight hours; and
   preparing the customized coffee beverage by selected dilution from at least a portion of the coffee extract stored in the brewer, wherein preparation of the customized coffee beverage occurs after the coffee extract has been stored in the brewer for from about five minutes to about forty-eight hours, the coffee extract having a brew solids yield of no more than 31.5% and a Delta Standard Yield of less than about 8%.

2. A process according to claim 1 for making a customized coffee beverage product by delaying dilution of a coffee extract for a period of time in excess of about 15 minutes after the onset of brewing of the extract.

3. A process according to claim 2 for making a customized coffee beverage product by delaying dilution of the coffee extract for a period of time in excess of about 30 minutes after onset of brewing of the extract.

4. A process according to claim 3 for making a customized coffee beverage product by delaying dilution of a coffee extract for a maximum period of about 48 hours after onset of brewing of the extract.

5. A process according to claim 4 for making a customized coffee beverage product by delaying dilution of a coffee extract for a period of time of less than about 24 hours after onset of brewing of the extract.

6. A process according to claim 5 for making a customized coffee beverage product by delaying dilution of a coffee extract for a period of time of less than about 12 hours after onset of brewing of the extract.

7. The process of claim 1 wherein the coffee extract is prepared from ingredients comprising an extract portion of water and a dry, roast and ground coffee, and the weight ratio of the extraction portion of water to the dry, roast and ground coffee is in the range of from about 5:1 to about 24:1.

8. The process of claim 7 wherein the weight ratios of the extraction portion of water to the dry, roast and ground coffee is in the range of from about8:1 to about 13:1.

9. The process of claim 4 wherein the weight ratio of the extraction portion of water to the dry, roast and ground coffee is in the range of from about 5:1 to about 24:1.

10. The process of claim 4 wherein the weight ratios of the extraction portion of water to the dry, roast and ground coffee is in the range of from about8:1 to about 13:1.

11. The process of claim 1 wherein the coffee extract is diluted at a coffee extract to water ratio in the range of from about zero to about 1:15.

12. The process of claim 4 wherein the coffee extract is diluted at a coffee extract to water ratio in the range of from about zero to about 1;:15.

13. The process of claim 1 wherein the coffee extract has a brew solids of less than about 10%.

14. The process of claim 13 wherein the coffee extract has a brew solids of less than about 5%.

15. The process of claim 14 wherein the coffee extract has a brew solids of less than about 4%.

16. The process of claim 15 wherein the coffee extract has a brew solids of less than about 3.5%.

17. The process of claim 1 wherein the coffee extract has a minimum brew solids of greater than about 1.2%.

18. The process of claim 17 wherein the coffee extract has a minimum brew solids of greater than about 1.5%.

19. The process of claim 18 wherein the coffee extract has a minimum brew solids of greater than about 2%.

20. The process of claim 4 wherein the coffee extract has a brew solids of less than about 10%.

21. The process of claim 20 wherein the coffee extract has a brew solids of less than about 5%.

22. The process of claim 21 wherein the coffee extract has a brew solids of less than about 4%.

23. The process of claim 22 wherein the coffee extract has a brew solids of less than about 3.5%.

24. The process of claim 4 wherein the coffee extract has a minimum brew solids of greater than about 1.2%.

25. The process of claim 24 wherein the coffee extract has a minimum brew solids of greater than about 1.5%.

26. The process of claim 25 wherein the coffee extract has a minimum brew solids of greater than about 2.0%.

* * * * *